J. K. O'Neil,
Hay Fork.
No. 3376. Reissued Mar. 8. 1870.
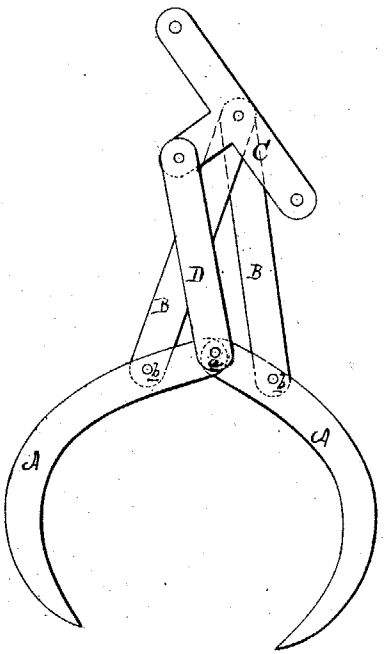
Witnesses
W. D. Smith
Thomas T. Parker
J. K. O'Neil

United States Patent Office.

JOHN K. O'NEIL, OF KINGSTON, NEW YORK.

*Letters Patent No.* 55,528, *dated June* 12, 1866; *reissue No.* 3,876, *dated March* 8, 1870.

IMPROVEMENT IN HORSE HAY-FORKS.

The Schedule referred to in these Letters Patent and making part of the same.

*To all whom it may concern:*

Be it known that I, JOHN K. O'NEIL, of Kingston, in the county of Ulster, and State of New York, have invented an Improved Horse Hay-Fork; and I do hereby declare that the following is a full and exact description thereof, reference being had to the accompanying drawings making part of this specification, and representing a side view of a two-tined grapple-fork provided with my improvements.

My invention consists in a lever forming the intermediate connection between the hoisting-rope and a grapple horse hay-fork, and so connected with the tines of the fork that by its action the tines are closed or made to grapple the hay, straw, or other similar substance. By it, also, they are held closed or grappled to the hay in the act of raising the same, and by reversing its closing movement they are disengaged from the hay or other substance.

The accompanying drawings represent the mode of applying the principle of my invention.

The tines A A of the fork being pivoted together at *a*, the lever C is connected therewith by means of bars or arms B B, which are pivoted, respectively, to the tines at points *b b*, at suitable, and, preferably, equal distances from the said pivot-joint *a* of the tines, and are also pivoted to the lever at a suitable point or points.

Another connecting-bar, D, is pivoted to the tines at their joint *a*, or near it, and to the lever at some distance from the point or points, where the connecting-arms B B are pivoted thereto, this pivot connection, as represented in the drawing, being in a side arm of the lever, and its distance from that of the said arms on the lever being such, in relation to the distance of the pivots *b b* from the pivot *a*, that the movements of the lever will close and open the tines sufficiently to grapple the hay and release it in turn.

The rope by which the fork with its load is elevated is attached to one end of the lever, a hole, represented in the drawings showing the point of attachment.

A double lever is represented, with a hole in each end, and the rope may be attached to either with similar effect.

The length of the rope arm of the lever may be as great as desired, in proportion to the length of the shorter arm, between the pivot points; and since the greater the weight of the hay lifted the more powerfully the tines of the fork are closed, the lever cannot fail to close the same and to hold them closed in all cases.

The reverse movement of the lever, for discharging the hay or other substance when elevated, may be effected by a supplementary or branch rope attached to the other end thereof, as respects the lifting, and so as to raise the other end above the end by which the hay is lifted.

In using the fork or grapple having the lever-attachment, the tines are opened and thrust down into the hay as far as can readily be effected by hand. The shape of the tines is such that the first act of lifting on the lever shall force the tines more deeply into the hay while closing or grappling into the same. This shape of the tines is determined thus: The inner curve of the lower ends, downward to the points, must be eccentric to the arc of a circle drawn around the pivot point *a* of the tines as a center. A wedge or cam-action will then be produced by the inner edges of the tines on the hay, causing them to further penetrate around the hay, when, by the action of the lever C the tines are pressed downward by the bars B B with as much force as they are drawn upward by the bar D, and consequently there is little tendency on the part of the power acting on the lever in its first movement to raise the fork out of the hay. The greater the eccentricity of the inner curve of the tines, the further they will tend to penetrate into the hay, but with a less powerful action or leverage, and *vice versa;* hence the eccentricity should be neither excessive nor too little.

These improvements may be applied to grapple-forks of three or more tines as well as to two-tined forks.

What I claim as my invention, and desire to secure by Letters Patent, is—

1. An intermediate lever, C, forming the suspending connection between thd hoisting-rope and a grapple horse hay-fork, and arranged in connection with the rope and the tines of the fork, substantially as described, so that by its movement and action in drawing up the rope the tines of the fork are closed, or made to grapple the hay or other similar substance to be raised, and by its action during the suspension the tines are held closed or grappled to the hay, and, finally, by the reversal of its movement, the hay is disengaged from the fork.

Also, the combination and arrangement of the arms or bars B B, connecting the lever C, with the tines of the fork at points *b b*, away from, and the rod or bar D, connecting the said lever with the fork at the pivot joint *a* of the tines, as herein specified.

Specification signed by me December 9, 1869.

JOHN K. O'NEIL.

Witnesses:
J. S. BROWN,
D. J. BROWN